United States Patent [19]
Kinoshita et al.

[11] Patent Number: 6,081,434
[45] Date of Patent: Jun. 27, 2000

[54] INSULATION-TYPE DC-DC POWER CONVERSION UNIT AND ELECTRIC SYSTEM FOR ELECTRIC VEHICLE

[75] Inventors: Shigenori Kinoshita, Kanagawa; Kouichi Ueki; Yasuo Kobayashi, both of Saitama, all of Japan

[73] Assignee: Fuji Electric Co., Ltd., Kanagawa, Japan

[21] Appl. No.: 09/273,437

[22] Filed: Mar. 22, 1999

[30] Foreign Application Priority Data

Mar. 23, 1998 [JP] Japan .................................. 10-073619
Apr. 14, 1998 [JP] Japan .................................. 10-101660

[51] Int. Cl.[7] ............................ H02M 3/335; H02M 3/22
[52] U.S. Cl. ................................ 363/24; 363/15; 363/127
[58] Field of Search .................................. 363/24, 16, 15, 363/89, 127, 125, 21; 323/268, 259; 318/701

[56] References Cited

U.S. PATENT DOCUMENTS 5,528,480   6/1996   Kikinis et al. .............................. 363/15

*Primary Examiner*—Shawn Riley
*Assistant Examiner*—Rajnikant B. Patel
*Attorney, Agent, or Firm*—Pearne & Gordon LLP

[57] ABSTRACT

A switch circuit comprising a semiconductor switch and an inverse-parallel diode is connected between a main electricity storage unit 4 and a primary winding 142P of an insulating transformer 142 and a switch circuit including a semiconductor switch and a diode is connected in inverse-parallel between a secondary winding 142S of the insulating transformer 142 and an auxiliary electricity storage unit 10. The switch circuits are controlled on/off, whereby power is supplied from the main electricity storage unit 4 to the auxiliary electricity storage unit 10 or from the auxiliary electricity storage unit 10 to the main electricity storage unit 4 for charging the electricity storage unit 10 or 4.

19 Claims, 12 Drawing Sheets

INSULATION-TYPE DC-DC POWER CONVERSION UNIT AND ELECTRIC SYSTEM FOR ELECTRIC VEHICLE

BACKGROUND OF THE INVENTION

1. Field of the Invention

This invention relates to an insulation-type DC-DC power conversion unit, which is appropriate for application to a charging system for an electric vehicle, and an electric system for the electric vehicle having the insulation-type DC-DC power conversion unit.

2. Description of the Related Art

FIG. 12 shows a representative drive system of a series hybrid electric vehicle. In the figure, reference numeral 1 denotes an engine, reference numeral 2 denotes a motor/generator, reference numeral 3 denotes a rectifier, reference numeral 4 denotes a main electricity storage unit for driving the vehicle, reference numeral 5 denotes an inverter, reference numeral 6 denotes an electric motor for driving the vehicle, reference numeral 7 denotes a reduction gear, reference numeral 8 denotes a differential gear, and reference numerals 9a and 9b denote wheels.

Reference numeral 10 denotes an auxiliary electricity storage unit used as a power supply of an auxiliary machine 11, reference numeral 12 denotes a charger for charging the auxiliary electricity storage unit 10 from the main electricity storage unit 4, and reference numeral 13 denotes a charger for charging the main electricity storage unit 4 from the auxiliary electricity storage unit 10. Usually, DC-DC converters are used in the chargers 12 and 13.

The voltage of the main electricity storage unit 4 is on the order of several hundred volts, while the voltage of the auxiliary electricity storage unit 10, which corresponds to a battery of an engine vehicle, is 12 V or 24 V. Thus, the chargers 12 and 13 are of electric insulation type.

The system in FIG. 12 converts mechanical energy of the engine 1 into electric energy by the dynamo (motor/generator 2) and again converts the electric energy into mechanical energy by the electric motor 6 through the rectifier 3 and the inverter 5 for driving the vehicle. This system is called series type because the energy flow is in series.

In the system, the dynamo driven by the engine 1 outputs almost constant electric power and the difference between a power generated by the motor/generator 2 and a power required for the electric motor 6 is covered by charging and discharging from the main electricity storage unit 4.

In the system as shown in FIG. 12, the motor/generator 2 are operated as the electric motor by the rectifier 3, and an electric power of the main electricity storage unit starts the engine 1 operating. Therefore, in the system, when the engine 1 is started, the electric power required for starting the engine 1 must be left in the main electricity storage unit 4.

The charger 13 is provided for the case where the electric power of the main electricity storage unit 4 is insufficient for starting the engine 1. That is, the charger 13 is operated for converting DC power of the auxiliary electricity storage unit 10 to charge the main electricity storage unit 4, and the engine 1 is started by the electric power of the main electricity storage unit 4.

After the engine 1 is started, the motor/generator 2 is caused to operate as the dynamo for charging the main electricity storage unit 4.

On the other hand, FIG. 13 shows a representative drive system of a parallel hybrid electric vehicle. Components identical with those previously described with reference to FIG. 12 are denoted by the same reference numerals in FIG. 13.

In the figure, reference numeral 100 denotes an engine, reference numerals 102a and 102b denote clutches, reference numeral 103 denotes a motor/generator, reference numeral 101 denotes a rectifier, and reference numeral 104 is a reduction gear. The clutch 102a is used to disconnect power of the engine 100 and the clutch 102b is provided for the reduction gear 104 like that used with an engine vehicle.

The system, which is called a torque assist system, is one kind of parallel system. It enables the engine 100 solely to drive the vehicle and also enables the motor/generator 103 solely to drive the vehicle electrically.

To drive the vehicle by the engine, an output of the engine 100 is inputted via a shaft of the motor/generator 103 to the reduction gear 104 for driving wheels 9a and 9b, and the motor/generator 103 operates as a dynamo for charging a main electricity storage unit 4 through the rectifier 101. To drive the vehicle electrically, the engine 100 is disconnected by the clutch 102a and the rectifier 101 is operated in an inverter mode by an electric power of the main electricity storage unit 4, thereby operating the motor/generator 103 as an electric motor. This operation method becomes similar to a method in the series system.

To start the engine 100, the clutch 102b is disconnected, the clutch 102a is connected, and the motor/generator 103 is operated as the electric motor. This method is also similar to the method in the series system.

FIG. 14 shows a drive system of a battery-operated electric vehicle. Components identical with those previously described with reference to FIGS. 12 and 13 are denoted by the same reference numerals in FIG. 14.

In FIG. 14, reference numeral 40 denotes a main electricity storage unit (main battery) for driving the vehicle, reference numeral 50 denotes an inverter, reference numeral 60 denotes an electric motor for driving the vehicle, and reference numeral 70 denotes a reduction gear. An electric vehicle having a battery as a power source can not continue to run if the electric power of the battery becomes insufficient. However, if such a situation occurs, it is necessary that the vehicle should be able to be moved to a safety place. Thus, a charger 13 is installed for charging an electric power of an auxiliary electricity storage unit 10 to the main electricity storage unit 40, and the vehicle is run and moved by the electric power of the main electricity storage unit 40.

FIG. 15 shows the circuit configuration of the charger 12 of the auxiliary electricity storage unit 10 shown in FIGS. 12 to 14. Here, a representative insulation-type bi-directional DC-DC converter is used as the charger 12.

In FIG. 15, reference numeral 120 denotes an input smoothing capacitor, reference numerals 121P and 121N denote semiconductor switches, reference numeral 122 denotes an insulating transformer having a primary side connected between the semiconductor switches 121P and 121N in series, reference numeral 122P denotes a primary winding of the insulating transformer 122, reference numeral 122S denotes a secondary winding of the insulating transformer 122, reference numerals 123P and 123N denote free-wheeling diodes connected between both ends of the capacitor 120 and both ends of the primary winding 122P, reference numerals 124 and 125 denote output rectifier diodes connected to both ends of the secondary winding 122S, reference numeral 126 denotes an output smoothing reactor, and reference numeral 127 denotes an output smoothing capacitor.

The operation of the circuitry in FIG. 15 will be described with reference to FIG. 16.

As shown in FIG. 16, the semiconductor switches 121P and 121N are turned on/off at the same time. In the figure, T denotes an operation period of the switches; Ton denotes an on period and Toff denotes an off period. The ratio of the on period Ton to the period T is controlled, whereby the charge current for the auxiliary electricity storage unit 10 is controlled.

FIG. 17 shows the circuit configuration of the charger 13 of the main electricity storage unit 4 or 40 shown in FIGS. 12 to 14. Here, a representative insulation-type bi-directional DC—DC converter is used as the charger 13.

In FIG. 17, reference numeral 130 denotes an input smoothing capacitor, reference numerals 131P and 131N denote semiconductor switches, reference numeral 132 denotes an insulating transformer having a primary side connected between the semiconductor switches 131P and 131N in series, reference numeral 132P denotes a primary winding of the insulating transformer 132, reference numeral 132S denotes a secondary winding of the insulating transformer 132, reference numerals 133P and 133N denote free-wheeling diodes which are connected between both ends of the capacitor 130 and both ends of the primary winding 132P, reference numerals 134 and 135 denote output rectifier diodes connected to both ends of the secondary winding 132S, reference numeral 136 denotes an output smoothing reactor, and reference numeral 137 denotes an output smoothing capacitor.

Putting the circuit configuration in FIG. 17 in contrast with that in FIG. 15, the circuitry in FIG. 17 results from inverting the input and output of the circuitry in FIG. 15; both circuit configurations are symmetrical and substantially the same and therefore the operation of the circuitry in FIG. 17 will not be described again.

The charger 13 shown in FIG. 17 charges the main electricity storage unit 4 or 40.

As shown in FIGS. 12 and 13, in the hybrid electric vehicle having the engine started by the electric power of the main electricity storage unit 4, the charger 13 in the case of emergency for charging the main electricity storage unit 4 from the auxiliary electricity storage unit 10 is provided aside from the service charger 12 for charging the auxiliary electricity storage unit 10 from the main electricity storage unit 4 so that the electric power of the auxiliary electricity storage unit 10 can be used to start the engine.

As shown in FIG. 14, the electric vehicle which runs only with the electric power of the main electricity storage unit 40 also comprises the charger 13 such as the above which is provided for the case where the electric power of the main electricity storage unit 40 is exhausted and the vehicle becomes impossible to run.

Thus, each of the electric vehicles including the hybrid electric vehicles comprises the emergency charger for the main electricity storage unit in addition to the service charger for the auxiliary electricity storage unit, resulting in upsizing, increase in weight, high cost, and the like of in-car machine, which are to be solved.

SUMMARY OF THE INVENTION

It is therefore an object of the invention to provide an insulation-type DC—DC power conversion unit enabling miniaturiztion, cost reduction, and efficiency improvement by improving a charging system and an electric system, for an electric vehicle comprising the power conversion unit.

According to a first aspect of the present invention, there is provided an insulation-type DC—DC power conversion unit for converting an electric power between a first DC supply and a second DC supply comprising:

an insulation transformer having a primary winding and a secondary winding;

a first input terminal connected to a positive electrode of the first DC supply;

a second input terminal connected to a negative electrode of the first DC supply;

a third input terminal connected to a positive electrode of the second DC supply;

a fourth input terminal connected to a negative electrode of the second DC supply;

a reactor connected to said third input terminal;

a first switch circuit including a semiconductor switch and a diode which are connected in inverse-parallel between said first input terminal and one end of said primary winding of said insulating transformer;

a second switch circuit including a semiconductor switch and a diode which are connected in inverse parallel between said second input terminal and the other end of said primary winding of said insulating transformer;

a third switch circuit including a semiconductor switch and a diode which are connected in inverse-parallel between one end of said secondary winding of said insulating transformer and said reactor;

a fourth switch circuit including a semiconductor switch and a diode which are connected in inverse-parallel between a node of the third switch circuit and said reactor and the other end of said secondary winding of said insulating transformer;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input terminal;

wherein a current flows in said semiconductor switch of said third switch circuit from said third input terminal toward said secondary winding;

wherein said a current flows in semiconductor switch of said fourth switch circuit from said third input terminal toward said fourth input terminal; and wherein said one end of said primary winding and said one end of said secondary winding are of the same polarity.

According to a second aspect of the present invention, there is provided a insulation-type DC—DC power conversion unit for converting an electric power between a first DC supply and a second DC supply comprising:

an insulation transformer having a primary winding and a secondary winding;

a first input terminal connected to a positive electrode of the first DC supply;

a second input terminal connected to a negative electrode of the first DC supply;

a third input terminal connected to a positive electrode of the second DC supply;

a fourth input terminal connected to a negative electrode of the second DC supply;

a reactor connected to said third input terminal;

a first switch circuit including a diode and a series circuit of a semiconductor switch and a saturable reactor, in which said series circuit and said diode are connected in inverse-parallel between said first input terminal and one end of said primary winding of said insulating transformer;

a second switch circuit including a diode and a series circuit of a semiconductor switch and a saturable reactor, in which said series circuit and said diode are connected in inverse-parallel between said second input terminal and the other end of said primary winding of said insulating transformer;

a third switch circuit including a diode and a series circuit of a semiconductor switch and a saturable reactor, in which said series circuit and said diode are connected in inverse-parallel between one end of said secondary winding of said insulating transformer and said reactor;

a fourth switch circuit including a diode and a series circuit of a semiconductor switch and a saturable reactor, in which said series circuit and said diode are connected in inverse-parallel between a node of the third switch circuit and said reactor and the other end of said secondary winding of said insulating transformer;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input terminal;

wherein a current flows in said semiconductor switch of said third switch circuit from said third input terminal toward said secondary winding;

wherein said a current flows in semiconductor switch of said fourth switch circuit from said third input terminal toward said fourth input terminal; and wherein said one end of said primary winding and said one end of said secondary winding are of the same polarity.

According to a third aspect of the present invention, there is provided an insulation-type DC—DC power conversion unit for converting an electric power between a first DC supply and a second DC supply comprising:

an insulation transformer having a primary winding and a secondary winding;

a first input terminal connected to a positive electrode of the first DC supply;

a second input terminal connected to a negative electrode of the first DC supply;

a third input terminal connected to a positive electrode of the second DC supply;

a fourth input terminal connected to a negative electrode of the second DC supply;

a reactor connected to said third input terminal;

a first switch circuit including a semiconductor switch, a circuit changing switch and a diode whose polarity is opposite to said semiconductor switch, in which either said diode or said semiconductor switch is connected between said first input terminal and one end of said primary winding of said insulating transformer through said circuit changing switch;

a second switch circuit including a semiconductor switch, a circuit changing switch and a diode whose polarity is opposite to said semiconductor switch, in which either said diode or said semiconductor switch is connected between said second input terminal and the other end of said primary winding of said insulating transformer through said circuit changing switch;

a third switch circuit including a semiconductor switch, a circuit changing switch and a diode whose polarity is opposite to said semiconductor switch, in which either said diode or said semiconductor switch is connected between one end of said secondary winding of said insulating transformer and said reactor through said circuit changing switch;

a fourth switch circuit including a semiconductor switch, a circuit changing switch and a diode whose polarity is opposite to said semiconductor switch, in which either said diode or said semiconductor switch is connected between a node of the third switch circuit and said reactor and the other end of said secondary winding of said insulating transformer through said circuit changing switch;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input terminal;

wherein a current flows in said semiconductor switch of said third switch circuit from said third input terminal toward said secondary winding;

wherein said a current flows in semiconductor switch of said fourth switch circuit from said third input terminal toward said fourth input terminal; and wherein said one end of said primary winding and said one end of said secondary winding are of the same polarity.

According to a fourth aspect of the present invention, there is provided an insulation-type DC—DC power conversion unit for converting an electric power between a first DC supply and a second DC supply comprising:

an insulation transformer having a primary winding and a secondary winding;

a first input terminal connected to a positive electrode of the first DC supply;

a second input terminal connected to a negative electrode of the first DC supply;

a third input terminal connected to a positive electrode of the second DC supply;

a fourth input terminal connected to a negative electrode of the second DC supply;

a reactor connected to said third input terminal;

a first switch circuit including a semiconductor switch, a circuit changing switch and a diode whose polarity is opposite to said semiconductor switch, in which either said diode or said switch circuit is connected between said first input terminal and one end of said primary winding of said insulating transformer through said circuit changing switch;

a second switch circuit including a semiconductor switch, a circuit changing switch and a diode whose polarity is opposite to said semiconductor switch, in which either said diode or said switch circuit is connected between said second input terminal and the other end of said primary winding of said insulating transformer through said circuit changing switch;

a third switch circuit between one end of said secondary winding and the other end of said secondary winding including a first semiconductor switch and a second semiconductor switch connected to each other in a series, a third diode and a fourth diode connected to each other in a series and a circuit changing switch which connects said reactor to either a node between said two semiconductor switches or a node between said two diodes;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input terminal;

wherein a current flows in said first semiconductor switch of said third switch circuit from said third input terminal toward said secondary winding;

wherein a current flows in said second semiconductor switch of said third switch circuit from said third input terminal toward said fourth input terminal;

wherein a current flows in said third diode of said third switch circuit from said secondary winding toward said third input terminal;

wherein a current flows in said second diode of said third switch circuit from said fourth input terminal toward said third input terminal; and wherein said one end of said primary winding and said one end of said secondary winding are of the same polarity.

According to the insulation-type DC—DC power conversion units of the present invention, said first and second switch circuits may be controlled for controlling an electric power flowing from the first and second input terminals toward said third and fourth input terminals.

According to the insulation-type DC—DC power conversion units of the present invention, said third and fourth switch circuits may be controlled for controlling an electric power flowing from said third and fourth input terminals toward said first and second input terminals.

According to the present invention, there is provided an electric system for an electric vehicle comprising:

a main electricity storage unit for driving a vehicle;

an auxiliary electricity storage unit for an auxiliary machine; and an insulation-type DC—DC power conversion unit as mentioned above connected between said main electricity storage unit and said auxiliary electricity storage unit.

According to the electric system for the electric vehicle of the present invention, said main electricity storage unit may be a chemical secondary battery.

According to the electric system for the electric vehicle of the present invention, said main electricity storage unit may be an electric double-layer capacitor battery.

According to the electric system for the electric vehicle of the present invention, said main electricity storage unit may be a solar battery.

According to the electric system for the electric vehicle of the present invention, said main electricity storage unit may be a fuel battery.

According to the electric system for the electric vehicle of the present invention, said auxiliary electricity storage unit may be an electric double-layer capacitor battery.

For a conventional charger, a power controller does not exist in an output circuit and the operation is one-quadrant operation wherein the power direction is unidirectional. Thus, an insulation-type DC—DC power conversion unit of the invention is designed paying attention to the fact that the output side of the conventional charger is provided with a power control function, whereby a charger performing the two-quadrant operation can be provided.

That is, in the insulation-type DC—DC power conversion unit of the invention, a semiconductor-switch is connected in parallel to a rectifier diode of an output circuit of the conventional charger and a diode is connected in parallel to a semiconductor switch of an input circuit of the conventional charger for providing a rectification function, whereby each of the primary and secondary sides of an insulating transformer is provided with a power control function, whereby a current bidirectional, two-quadrant operation type charger is realized.

Thus, a single insulation-type DC—DC power conversion unit can serve as both service and emergency chargers.

The power conversion unit is installed in the electric vehicle, whereby downsizing, weight saving, cost reduction, etc., of in-car machines are enabled.

DETAILED DESCRIPTION OF THE PRESENT INVENTION

The Present invention will be described with reference to the accompanying drawings.

(First Embodiment)

Figure 1:
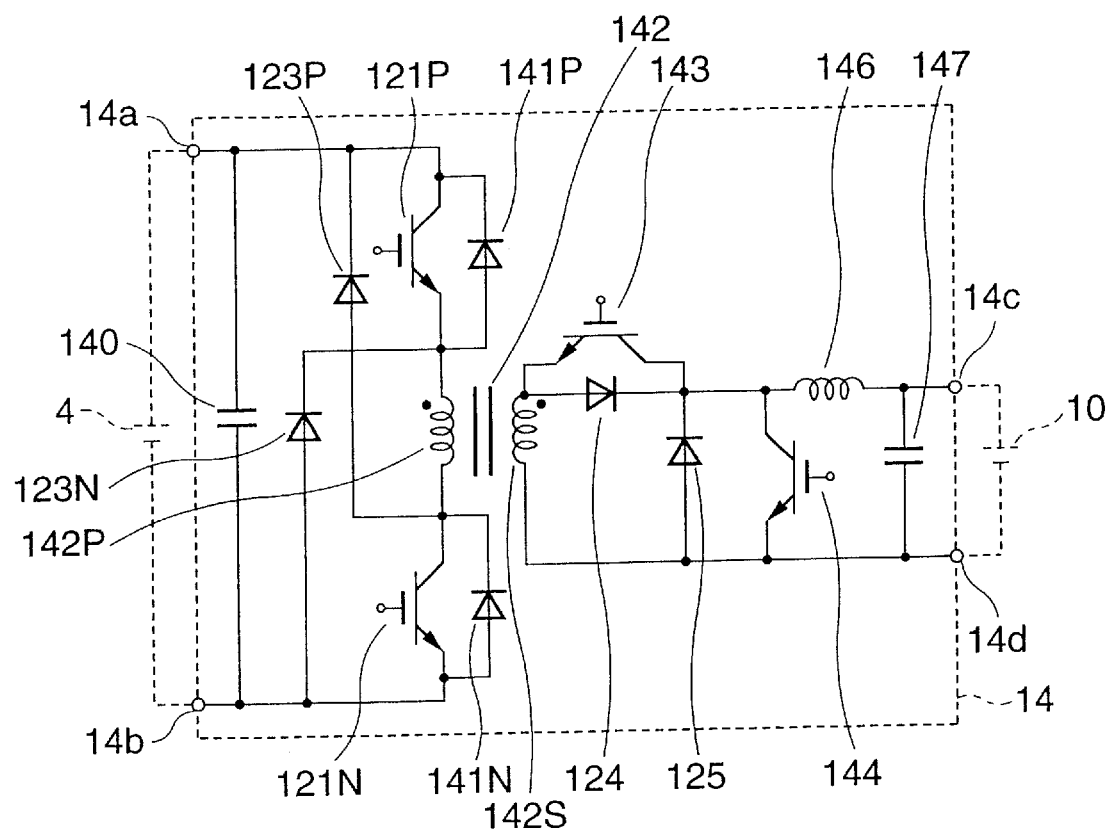
FIG. 1 is a diagram showing a circuit configuration of an insulation-type DC—DC power conversion unit according to a first embodiment of the invention.

FIG. 1 shows a first insulation-type DC—DC power conversion unit of the invention. Components identical with those previously described with reference to FIG. 15 are denoted by the same reference numerals in FIG. 1.

In. FIG. 1, reference numeral 14 denotes an insulation-type DC—DC power conversion unit of the invention, reference numeral 14a denotes a first input terminal connected to a positive electrode of a main electricity storage unit 4 as a first DC power supply, reference numeral 14b denotes a second input terminal connected to a negative electrode of the main electricity storage unit 4, reference numeral 14c denotes a third input terminal connected to a positive electrode of an auxiliary electricity storage unit 10 as a second DC power supply, and reference numeral 14d denotes a fourth input terminal connected to a negative electrode of the auxiliary electricity storage unit 10.

Reference numeral 140 denotes a smoothing capacitor connected between the input terminals 14a and 14b. Reference numeral 142 denotes an insulating transformer having a primary winding 142P and a secondary winding 142S, and semiconductor switches 121P and 121N are connected between the input terminals 14a and 14b and both ends of the primary winding 142P. Further, rectifier diodes 141P and 141N are connected to the semiconductor switches 121P and 121N respectively in inverse parallel, and these inverse-parallel circuits form first and second switch circuits.

Figure 15:
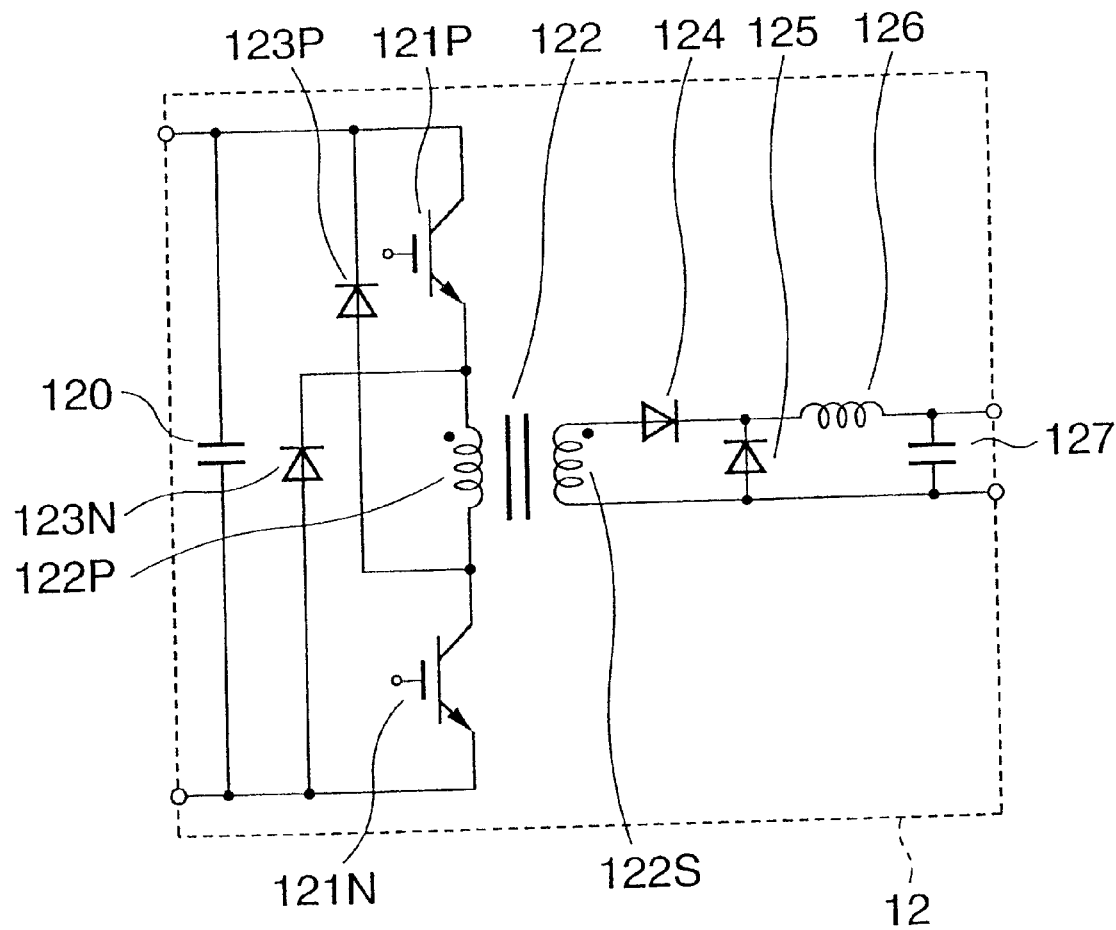
FIG. 15 is a view showing the circuit configuration of a charger of an auxiliary storage battery unit in FIGS. 12 to 14.

Rectifier diodes 124 and 125 are connected to both ends of the secondary winding 142S of the insulating transformer 142, as in FIG. 15. In the embodiment, semiconductor switches 143 and 144 are connected to the diodes 124 and 125 respectively in inverse parallel, and these inverse-parallel circuits form third and fourth switch circuits.

Reference numeral 146 denotes a smoothing reactor of the auxiliary electricity storage unit 10 and reference numeral 147 denotes a smoothing capacitor.

The windings 142P and 142S of the insulating transformer 142 are of the same polarity in one end with a dot.

Figure 17:
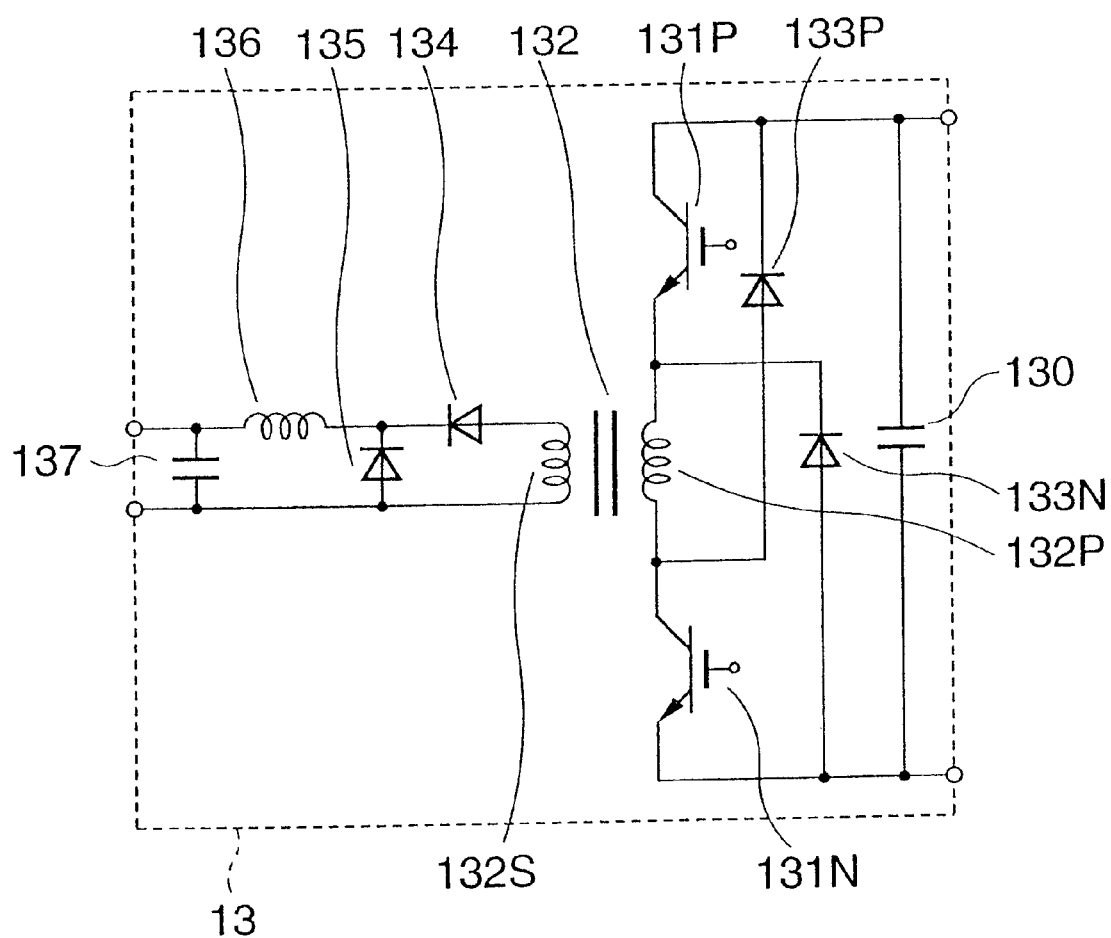
FIG. 17 is a diagram showing the circuit configuration of a charger of a main storage battery unit in FIGS. 12 to 14.

In the embodiment, the semiconductor switch 121P and the diode 141P, the semiconductor switch 121N and the diode 141N, the semiconductor switch 143 and the diode 121, and the semiconductor switch 144 and the diode 125 forming the first to fourth switch circuits are shown separately; a diode is connected to a normal semiconductor switch such as a transistor in inverse parallel. Thus, in the invention, such switch circuits are used, whereby the number of switch circuits (semiconductor switches) in the circuitry becomes as many as those when the charger 12 in FIG. 15 and the charger 13 in FIG. 17 are used in combination.

Figure 16:
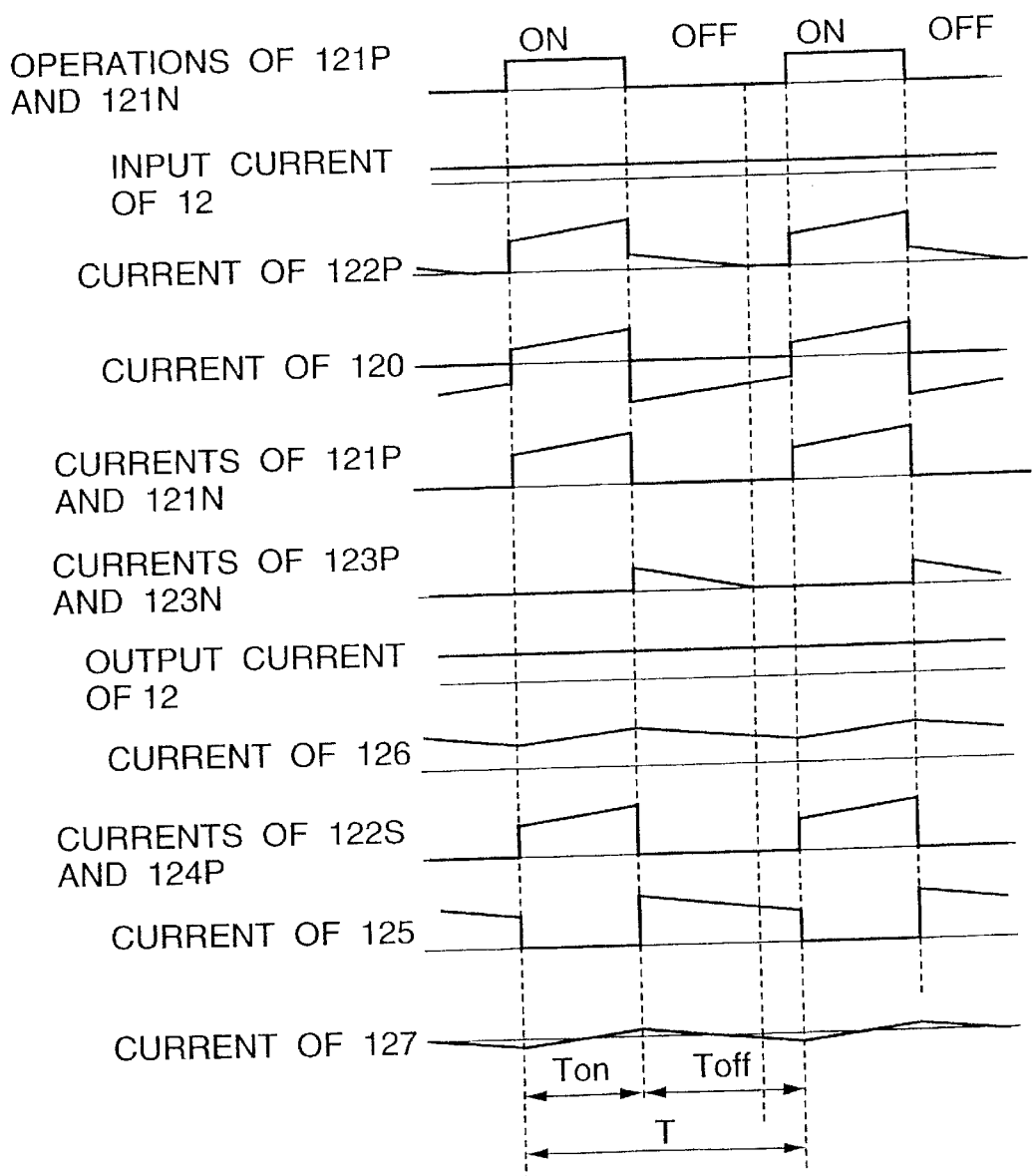
FIG. 16 is a wave form chart showing the operation of the charger in FIG. 15.

Next, the operation of the circuitry in FIG. 1 will be described. First, at the normal service charging time during which the auxiliary electricity storage unit 10 is charged from the main electricity storage unit 4, the semiconductor switches 143 and 144 are turned off and the semiconductor switches 121P and 121N are controlled on/off. In this case, the semiconductor switches 143 and 144 are off, thus the circuitry becomes substantially the same as that in FIG. 15 and control and the operation of the semiconductor switches 121P and 121N also become the same as those in FIG. 15. Therefore, the operation of the whole circuitry is similar to that in FIG. 16. and will not be described again.

Figure 2:
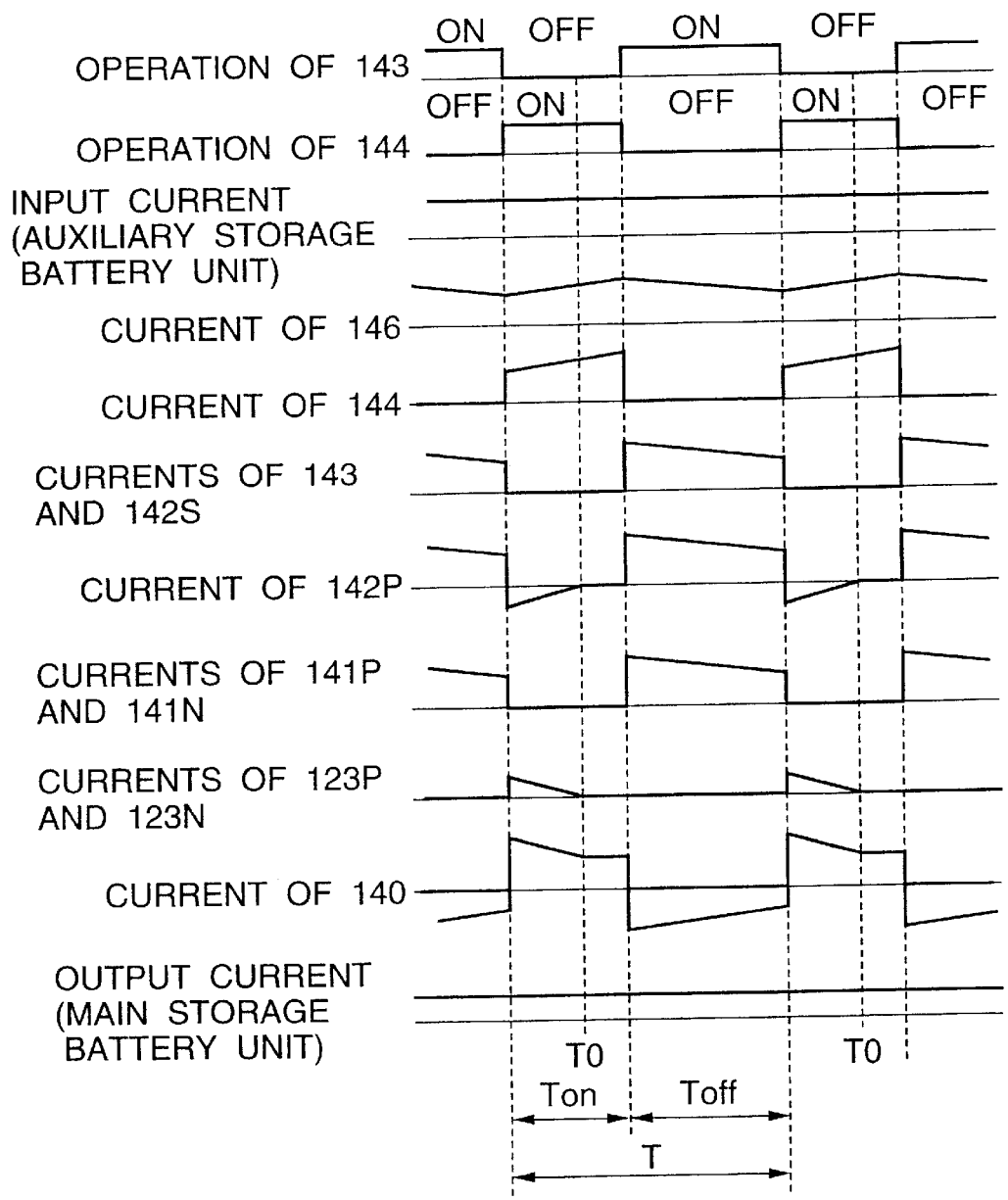
FIG. 2 is a wave form chart showing the operation of the conversion unit of the present invention.

Next, at the emergency charging time during which the main electricity storage unit 4 is charged from the auxiliary electricity storage unit 10, the semiconductor switches 121P and 121N are turned off and the semiconductor switches 143 and 144 are controlled on/off. FIG. 2 shows the operation at this time.

In the operation, as shown in FIG. 2, the semiconductor switch 144 is turned on at the same time as the semiconductor switch 143 is turned off, and the semiconductor switch 144 is turned off at the same time as the semiconductor switch 143 is turned on. In FIG. 2, T denotes an on/off operation period of the switches; Ton denotes an on period of the semiconductor switch 144 and Toff denotes an off period of the semiconductor switch 144. The ratio of the on period Ton to the period T is controlled, whereby the charge current is controlled.

In $T_{on}$ term, the semiconductor switch 143 is turned off and the semiconductor switch 144 is turned on, which results in that a current flowing in the reactor 146 increases. Because the semiconductor switch 143 is turned off, a current excited in the secondary coil 142S of the insulation transformer 142 flows through the primary coil of the insulation transformer 142. Thereafter, the excited current is reduced to become 0 (A) at time $T_0$. The excited current flows through the diodes 123P and 123N. A current difference between the excited current and main electricity storage unit 4 flows in the smoothing capacitor 140. In this case, a current from the main electricity storage unit 4 is constant.

In $T_{off}$ term, the semiconductor switch 144 is turned off and the semiconductor switch 143 is turned on, which results in that the current flowing in the reactor 146 flows through the secondary coil of the insulation transformer 142, so that the current decreases. The current flows in the primary coil through the insulation transformer before the current flows to the smoothing capacitor 140 and the main electricity storage unit 4 through the diodes 141P and 141N. A current difference between the main electricity storage unit 4 and the current flowing in the diodes 141P and 141N flows in the smoothing capacitor 140. In this case, a current from the main electricity storage unit 4 is also constant.

Thus, in the embodiment, the functions of both the service charger 12 and the emergency charger 13 in the related arts previously described with reference to FIGS. 15 and 17 can be provided by the insulation-type DC—DC power conversion unit 14 in FIG. 1 which performs the two-quadrant operation with bidirectional currents. The number of the semiconductor switches of the insulation-type DC—DC power conversion unit 14 is the same as the total number of the semiconductor switches of both the service charger 12 and the emergency charger 13 in FIGS. 15 and 17, namely, is four and further the number of the insulating transformers is reduced to a half. Thus, if the power conversion unit 14 is considered as a charger, miniaturization, cost reduction and high efficiency of the unit can be realized.

Figure 3:
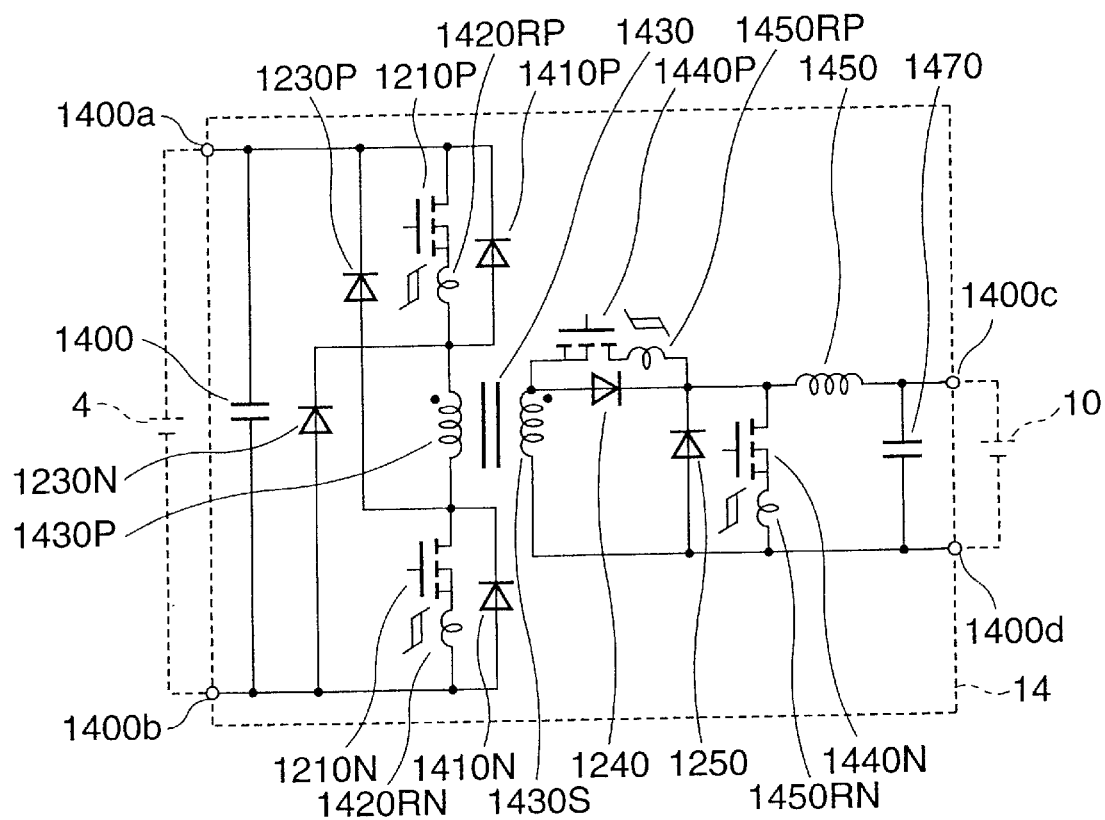
FIG. 3 is a diagram showing the circuit configuration of an insulation-type DC—DC power conversion unit according to the second embodiment of the invention.

FIG. 3 shows a second insulation-type DC—DC power conversion unit of the invention.

In FIG. 3, reference numeral 14 denotes an insulation-type DC—DC power conversion unit of the invention, reference numeral 1400a denotes a first input terminal connected to a positive electrode of a main electricity storage unit 4 as a first DC power supply, reference numeral 1400b denotes a second input terminal connected to a negative electrode of the main electricity storage unit 4, reference numeral 1400c denotes a third input terminal connected to a positive electrode of an auxiliary electricity storage unit 10 as a second DC power supply, and reference numeral 1400d denotes a fourth input terminal connected to a negative electrode of the auxiliary electricity storage unit 10.

Reference numeral 1400 denotes a smoothing capacitor connected between the input terminals 1400a and 1400b. Reference numeral 1430 denotes an insulating transformer having a primary winding 1430P and a secondary winding 1430S. A series circuit of a semiconductor switch 1210P and a saturable reactor 1420RP and a series circuit of a semiconductor switch 1210N and a saturable reactor 1420RN are connected between the input terminals 1400a and 1400b and both ends of the primary winding 1430P. Further, rectifier diodes 1410P and 1410N are connected to the series circuits in inverse parallel, and these inverse-parallel circuits form first and second switch circuits.

Rectifier diodes 1240 and 1250 are connected to both ends of the secondary winding 1430S of the insulating transformer 1430, as in FIG. 15. In the embodiment, a series circuit of a semiconductor switch 1440P and a saturable reactor 1450RF and a series circuit of a semiconductor switch 1440N and a saturable reactor 1450RN are connected to the diodes 1240 and 1250 respectively in inverse parallel, and these inverse-parallel circuits form third and fourth switch circuits.

Reference numeral 1460 denotes a smoothing reactor of the auxiliary electricity storage unit 10 and reference numeral 1470 denotes a smoothing capacitor.

The windings 1430P and 1430S of the insulating transformer 1430 are of the same polarity in one end with a dot.

In the embodiment, if the semiconductor switches 1210P, 1210N, 14402, and 1440N forming the first to fourth switch circuits are formed of FETs (field-effect transistors) as shown in FIG. 3, parasitic diodes exist in the FETs. The parasitic diodes existing in the semiconductor switches have the same polarity as inverse-parallel diodes. That is, the parasitic diodes are connected in parallel to the diodes 1410P, 1410N, 1240, and 1250 connected in inverse parallel.

On the other hand, the diodes 1410P, 1410N, 1240, and 1250 connected in inverse parallel are selected based on the frequency characteristics considering the switching frequencies of the semiconductor switch circuits.

Generally, the frequency characteristics of the parasitic diodes in the FETs are poor as compared with those of the diodes 1410P, 141ON, 1240, and 1250 connected in inverse parallel. The switching performance of the switch circuits with the parasitic diodes connected in parallel to the diodes connected in inverse parallel is limited by the frequency characteristics of the parasitic diodes. That is, a limitation on high frequencies, an increase in a switching loss, and an increase in electromagnetic noise are involved, thus the parasitic diodes need to be disconnected electrically. The saturable reactors 1420RP, 1420RN, 1450RP, and 1450RN shown in FIG. 3 are elements inserted to solve the above problem.

Next, the operation of the semiconductor switch circuits in FIG. 3 will be described with reference to FIGS. 4A, 4B and 4C.

Figure 4A:
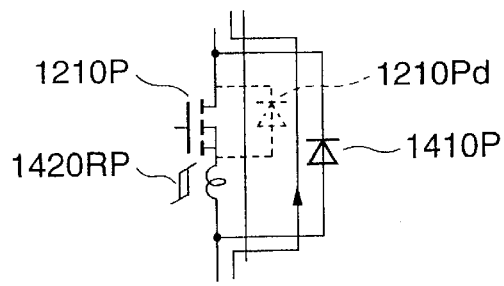
FIG. 4A is a detailed circuit diagram showing the switch circuit in FIG. 3.

FIG. 4A shows the semiconductor switch 1210P and its peripheral circuit in FIG. 3. In FIG. 4A, reference numeral 121Pd indicated by dashed lines denotes a parasitic diode contained in the semiconductor switch 1210P.

Figure 4B:
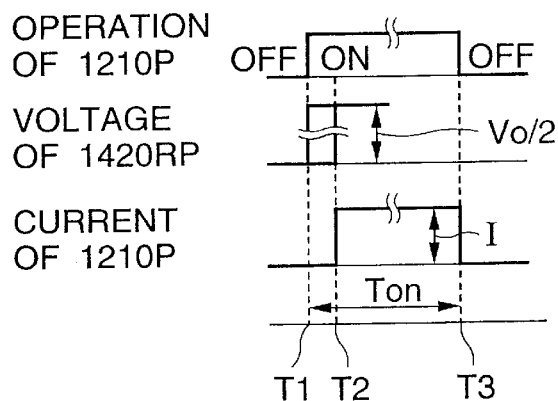
FIGS. 4B and 4C are wave form charts showing the operation of switch circuit in FIG. 3.

FIG. 4B shows the operation performed when the semiconductor switch 1210P is turned on (the semiconductor switch 1210N is also turned on although not shown). When the semiconductor switch 1210P (and 1210N) is (are) turned on at time T1, a current attempts to flow in the thin arrow direction in FIG. 4A and a voltage is added to the saturable reactor 1420RP in the dot direction in FIG. 4A. At the same time, voltage is also added to the saturable reactor 1420RN (not shown).

The magnitude of the voltage added to the saturable reactor 1420RP (1420RN) becomes half a voltage Vb of the main electricity storage unit 4, and is saturated at time T2. When the saturable reactor 1420RP (1420RN) is saturated, a load current I flows into the semiconductor switch 1210P (1210N) until off time T3. The time T1 to T3 in FIG. 4B corresponds to Ton shown in FIG. 6.

Figure 4C:
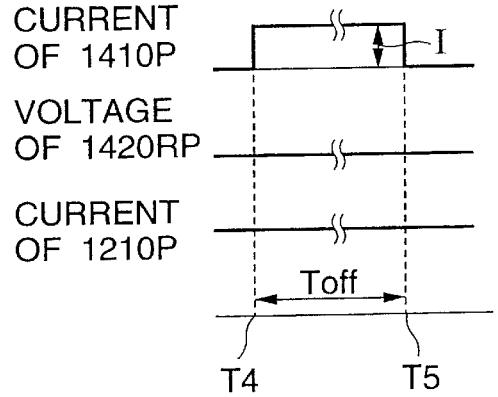

FIG. 4C shows the operation performed when a current flows in the solid arrow direction in FIG. 4A. When a current flows into the diode 1410P at time T4, a voltage drop Vd occurs across the diode 1410P. This voltage Vd is added to a series circuit of the parasitic diode 1210Pd and the saturable reactor 1420RP. Thus, the voltage of the saturable reactor 1420RP is equal to a voltage drop of the parasitic diode 1210Pd subtracted from the voltage Vd. Since the voltage drop of the parasitic diode 1210Pd becomes almost the same magnitude as the voltage drop Vd of the diode 1410P, the voltage of the saturable reactor 1420RP becomes almost zero.

Thus, in the period Toff between times T4 and T5 shown in FIG. 4C, the saturable reactor 1420RP is not saturated and has a large impedance. Therefore, the current of the saturable reactor 1420RP, namely, the current of the semiconductor switch 1210P becomes almost zero and load current flows into the diode 1410P.

Next, the operation of the circuitry in FIG. 3 will be described. First, at the normal service charging time during which the auxiliary electricity storage unit 10 is charged from the main electricity storage unit 4, the semiconductor switches 1440P and 1440N are turned off and the semiconductor switches 1210P and 1210N are controlled on/off. In this case, the semiconductor switches 1440P and 1440N are off and the saturable reactors 1420RP, 1420RN, 1450RP, and 1450RN little affect the circuit operation, thus the circuitry becomes substantially the same as that in FIG. 15 and control and the operation of the semiconductor switches 1210P and 1210N also become the same as those in FIG. 15. Therefore, the operation of the whole circuitry is similar to that in FIG. 16 and will not be discussed again.

Next, at the emergency charging time during which the main electricity storage unit 4 is charged from the auxiliary electricity storage unit 10, the semiconductor switches 1210P and 1210N are turned off and the semiconductor switches 1440P and 1440N are controlled on/off. In this case, the circuit configuration becomes that of an insulation-type step-up DC—DC converter.

Figure 5:
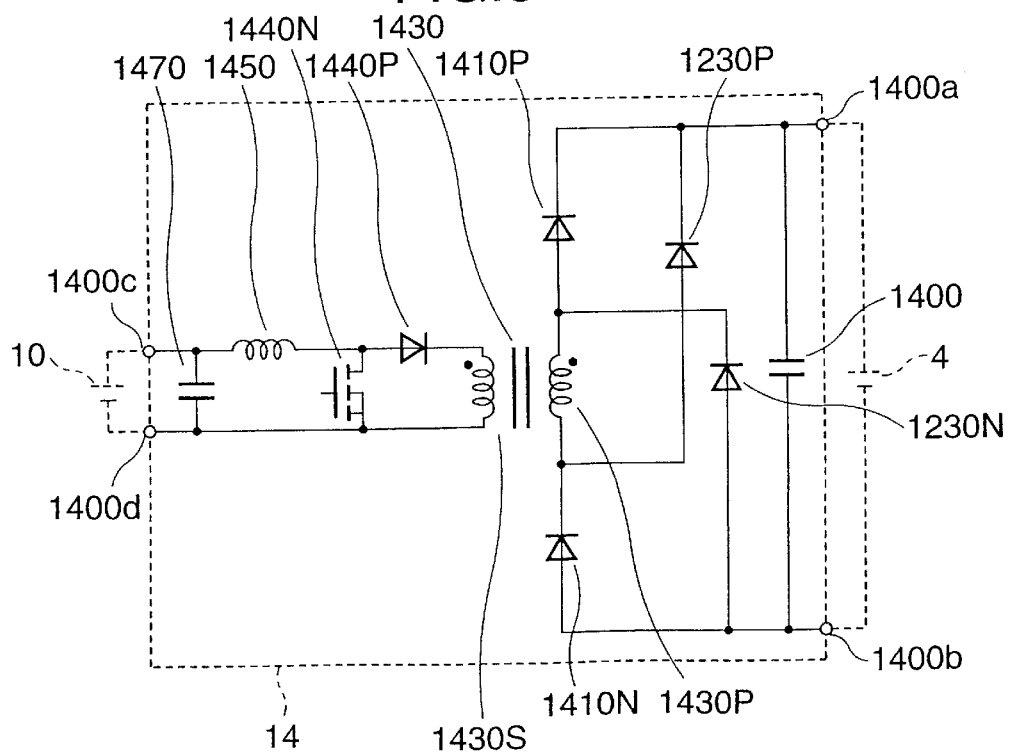
FIG. 5 is a view showing a circuit configuration at the emergency charging time in the second embodiment of the invention.

FIG. 5 shows the circuit configuration in this case. Components identical with those previously described with reference to FIG. 3 are denoted by the same reference numerals in FIG. 5. The semiconductor switch 1440P, which is used as a diode, is indicated by a diode symbol in FIG. 5. The semiconductor switch 1440N is controlled on/off and the main electricity storage unit 4 on the high-pressure side is charged through the insulating transformer 1430 from the auxiliary electricity storage unit 10 on the low-pressure side.

Figure 6:
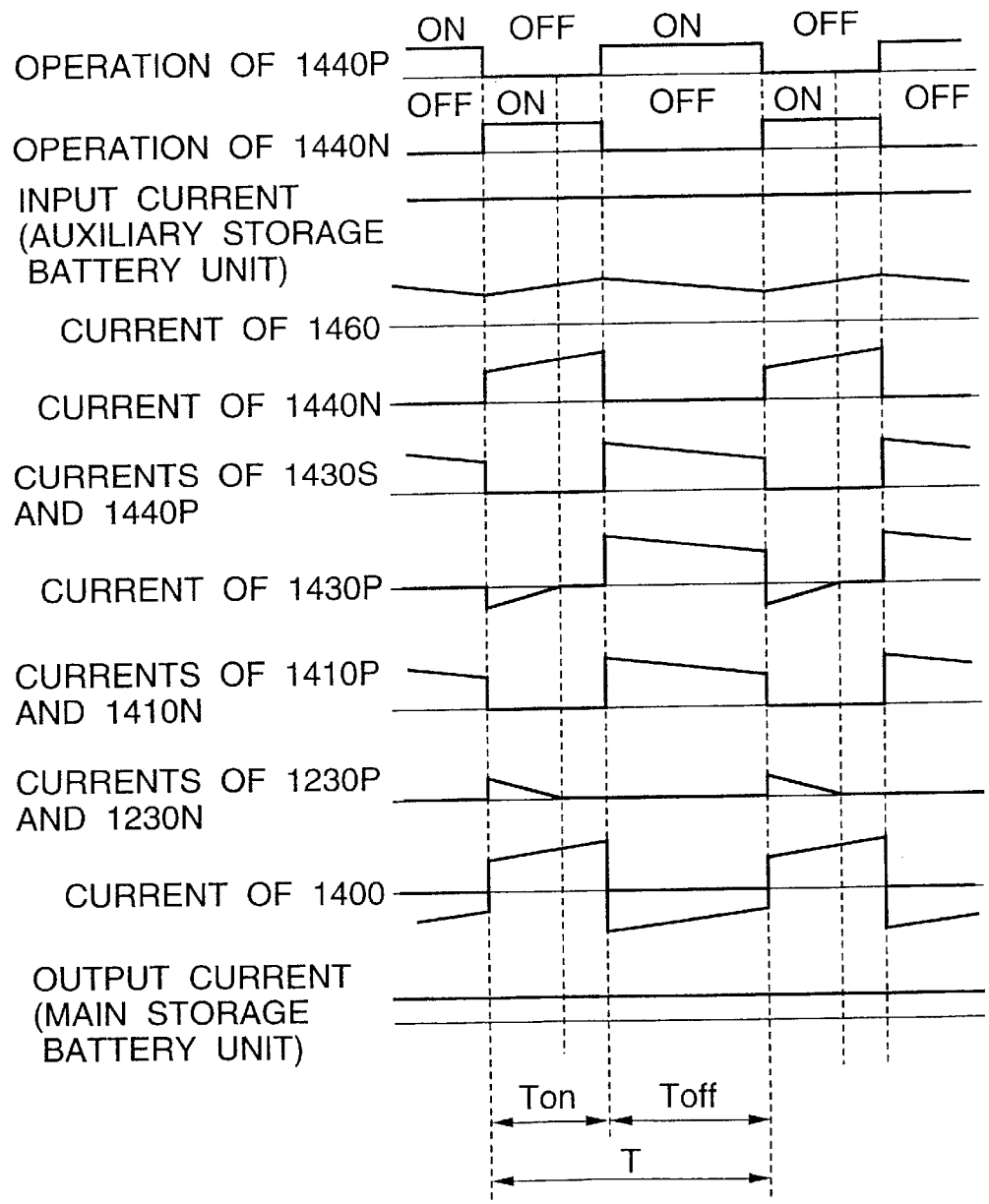
FIG. 6 is a schematic representation of the operation of the insulation-type DC—DC power conversion unit in FIG. 3.

FIG. 6 shows the operation in this case. In the operation, as shown in FIG, 6, the semiconductor switch 1440N is turned on at the same time as the semiconductor switch 1440P is turned off, and the semiconductor switch 1440N is turned off at the same time as the semiconductor switch 1440P is turned on. In FIG. 6, T denotes the on/off operation period of the switches; Ton denotes an on period of the semiconductor switch 1440N and Toff denotes an off period of the semiconductor switch 1440N. The ratio of the on period Ton to the period T is controlled, whereby the charge current is controlled.

Thus, in the embodiment, the functions of both the service charger 12 and the emergency charger 13 in the related arts previously described with reference to FIGS. 15 and 17 can be provided by the insulation-type DC—DC power conversion unit 14 in FIG, 3 which performs the two-quadrant operation with bidirectional currents. The number of the semiconductor switches of the insulation-type DC—DC power conversion unit 14 is the same as the total number of the semiconductor switches of both the service charger 12 and the emergency charger 13 in FIGS. 15 and 17, namely, is four and further the number of the insulating transformers is reduced to a half. Thus, if the power conversion unit 14 is considered as a charger, miniaturization, cost reduction, and high efficiency of the unit can be realized.

(Third Embodiment)

Figure 7:
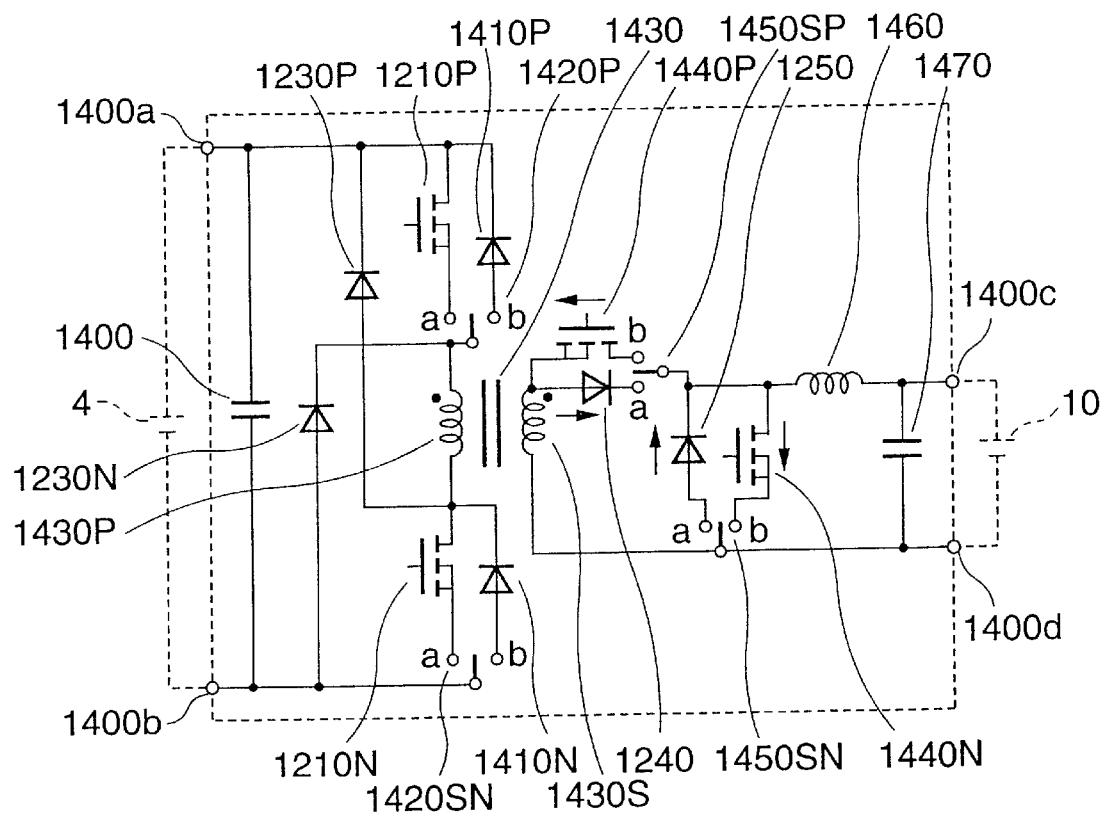
FIG. 7 is a diagram showing the circuit configuration of an insulation-type DC—DC power conversion unit according to the third embodiment of the invention.

FIG. 7 shows a third embodiment of the invention. Components identical with those previously described with reference to FIG. 3 are denoted by the same reference numerals in FIG. 7.

In FIG. 7, reference numerals 1420SP, 1420SN, 1450SP, and 1450SN are circuit change switches.

At the normal service charging time, the circuit change switches 1420SP, 1420SN, 1450SP, and 1450SN are all connected to contacts (a), whereby diodes 1410P and 1410N and semiconductor switches 1440P and 1440N are disconnected from the circuit and the circuit configuration becomes similar to that in FIG. 15. For control, semiconductor switches 1210P and 1210N are controlled on/off as in FIG. 16.

Since the semiconductor switches 1440P and 1440N are disconnected from the circuit, the above-described problem caused by parasitic diodes contained in the semiconductor switches 1440P and 1440N does not occur.

In FIG. 7, at the emergency charging time, the circuit change switches 1420SP, 1420SN, 1450SP, and 1450SN are all connected to contacts (b), whereby semiconductor switches 1210P and 1210N and diodes 1240P and 1250N are disconnected from the circuit and the circuit configuration becomes an insulation-type step-up DC—DC converter such as the circuit configuration (FIG. 5) at the emergency charging time in FIG. 3. Therefore, a main electricity storage unit 4 is charged by turning on and off the semiconductor switches 1440P and 1440N.

At this time, the semiconductor switches 1210P and 1210N are disconnected from the circuit, thus the above-described problem caused by parasitic diodes contained in the semiconductor switches 1210P and 1210N does not occur.

(Fourth Embodiment)

Figure 8:
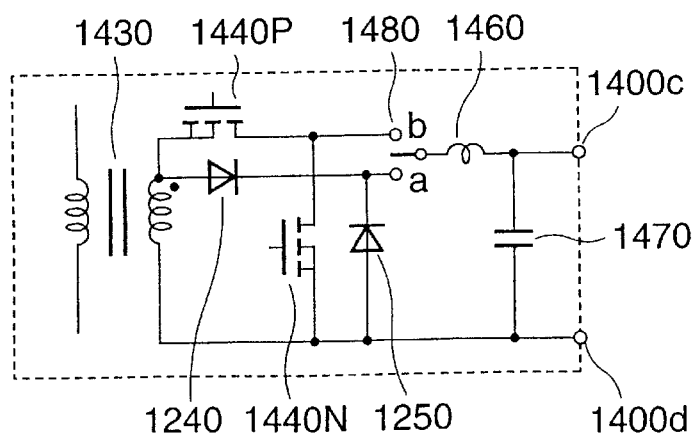
FIG. 8 is a diagram showing the circuit configuration of an insulation-type DC—DC power conversion unit according to the fourth embodiment of the invention.

FIG. 8 shows a fourth embodiment of the invention. It shows a secondary side only of an insulating transformer 1430 and a primary side thereof is similar to that in FIG. 7.

In FIG. 8, reference numeral 1480 denotes a circuit change switch and the circuit change switches 1450SP and 1450SN in FIG. 7 are shared.

Semiconductor switches 1440P and 1440N connected in series form third and fourth switch circuits.

In FIG. 8, at the normal service charging time, a circuit change switch 1480 is connected to contact (a), whereby the semiconductor switches 1440P and 1440N are disconnected from the circuit and the circuit configuration becomes the same as that at the normal service charging time in FIG. 7.

At the emergency charging time, the circuit change switch 1480 is connected to contact (b), whereby diodes 1240 and 1250 are disconnected from the circuit and the circuit configuration becomes the same as that at the emergency charging time in FIG. 7.

In the embodiment, the semiconductor switches 1440P and 1440N are disconnected from the circuit, thus the above-described problem caused by parasitic diodes contained in the semiconductor switches 1440P and 1440N does not occur.

(Fifth Embodiment)

Figure 9:
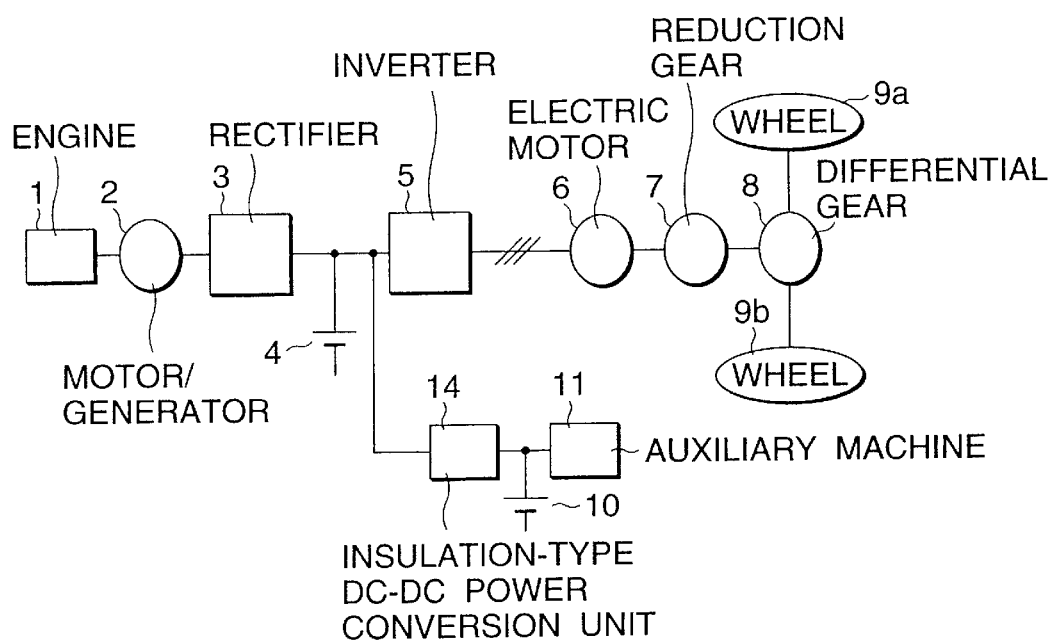
FIG. 9 is a view showing a drive system of a series hybrid electric vehicle of the invention.

FIG. 9 shows an embodiment of the invention using the DC—DC power conversion units of the invention in which one of the insulation-type DC—DC power conversion units described above is applied to a series hybrid electric vehicle.

Figure 12:
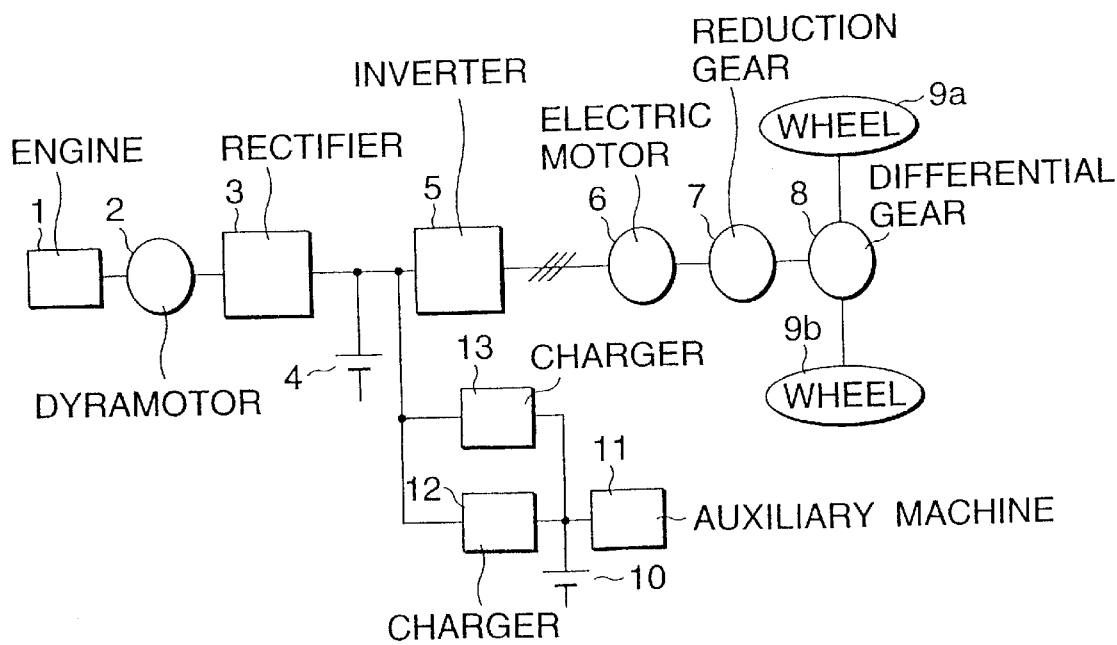
FIG. 12 is a view showing a drive system of a series hybrid electric vehicle as a related art.

Components identical with those previously described with reference to FIG. 12 are denoted by the same reference numerals in FIG. 9. In the configuration, the service charger 12 and the emergency charger 13 in FIG. 12 are replaced with the DC—DC power conversion unit 14 described in the first to fourth embodiments.

(Sixth embodiment)

Figure 10:
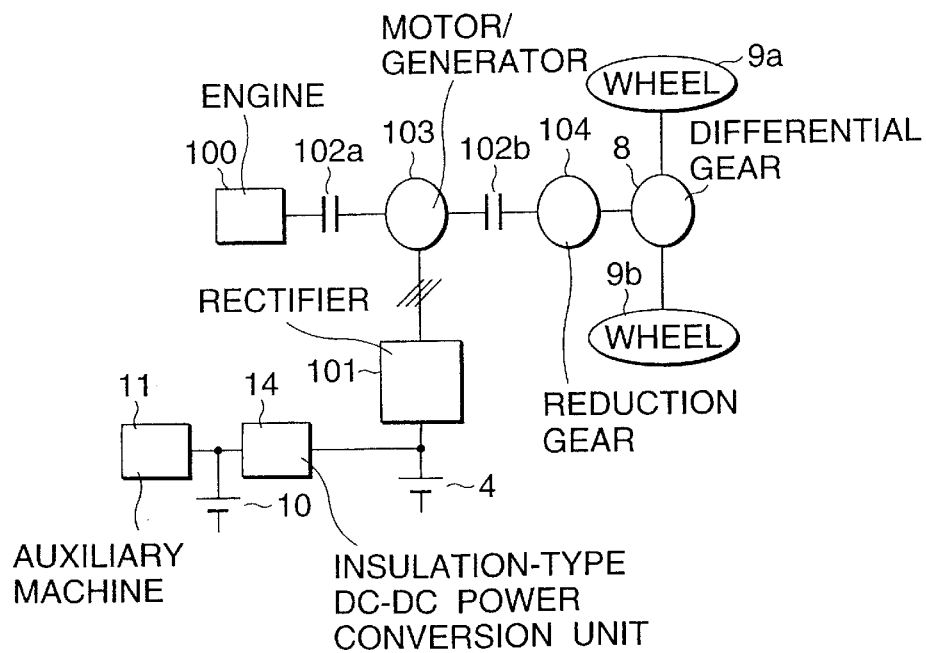
FIG. 10 is a view showing a drive system of a parallel hybrid electric vehicle as a third embodiment of the invention.

FIG. 10 also shows an embodiment of the invention using the DC—DC power. conversion units of the invention, in which one of the insulation-type DC—DC power conversion units described above is applied to a parallel hybrid electric vehicle.

Figure 13:
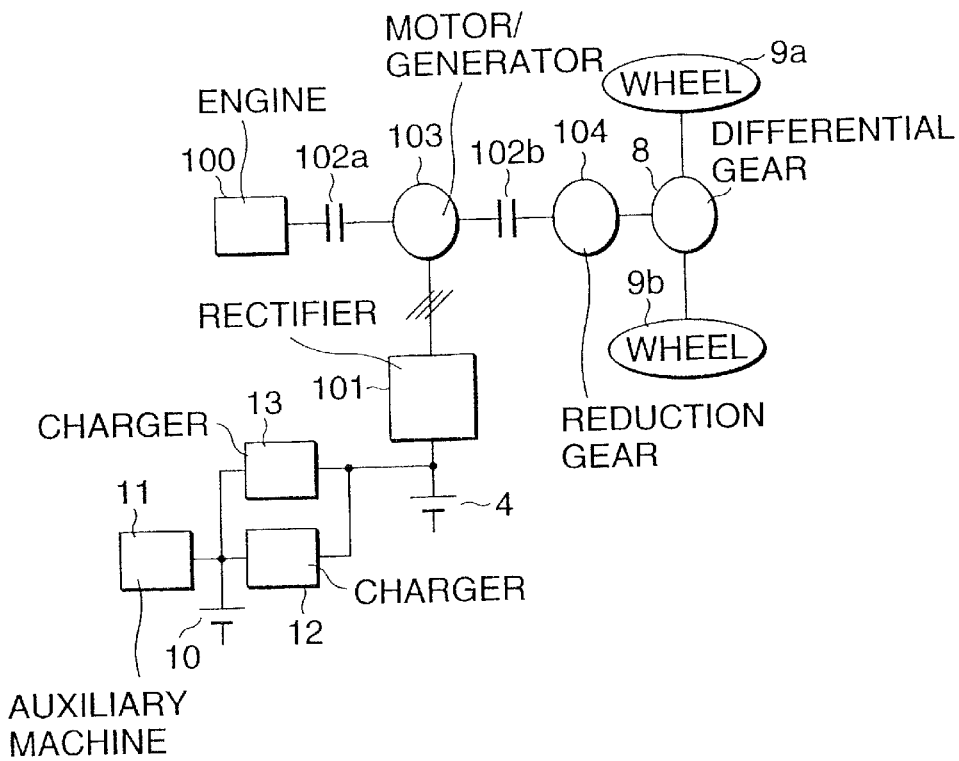
FIG. 13 is a view showing a drive system of a parallel hybrid electric vehicle as a related art.

That is, in the configuration, the service charger 12 and the emergency charger 13 in FIG. 13 are replaced with the DC—DC power conversion unit 14 described in the first to fourth embodiments.

(Seventh Embodiment)

Figure 11:
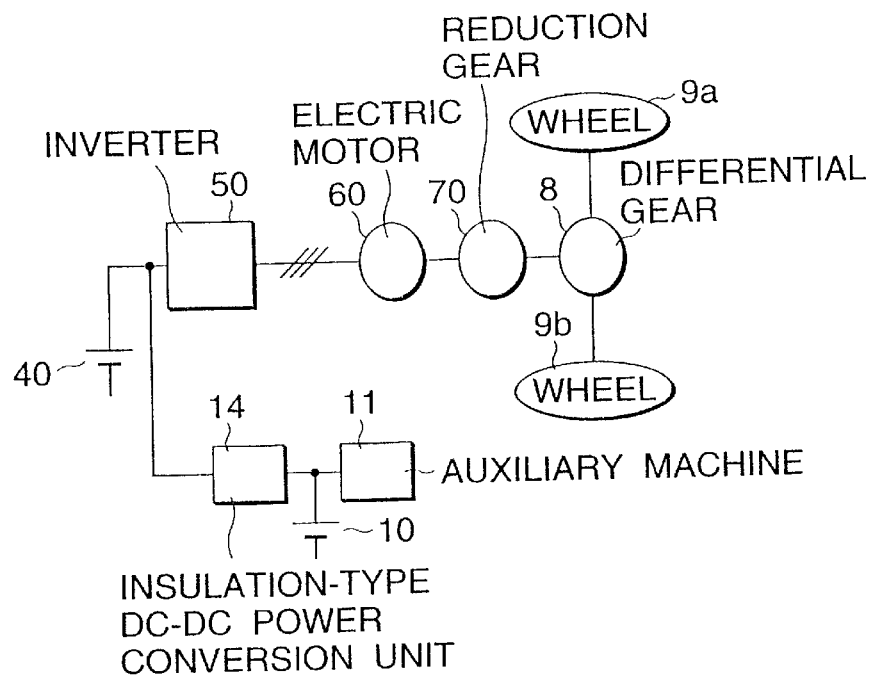
FIG. 11 is a view showing a drive system of a battery-operated electric vehicle as a fourth embodiment of the invention.

FIG. 11 also shows an embodiment of the invention using the DC—DC power conversion unit of the invention, in which the insulation-type DC—DC power conversion units described above is applied to an electric vehicle which runs only with electric power of main electricity storage unit 40.

Figure 14:
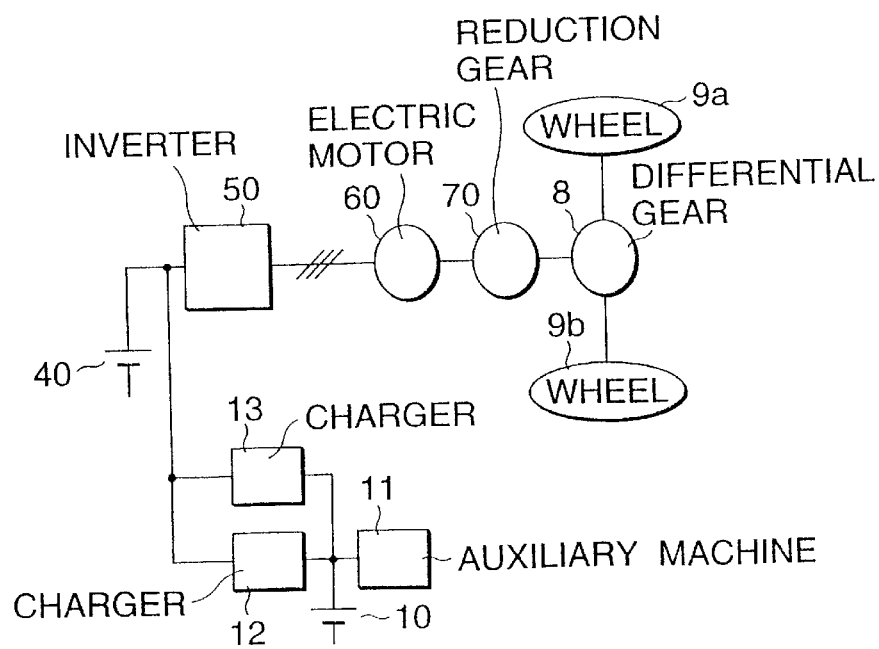
FIG. 14 is a view showing a drive system of a battery-operated electric vehicle as a related art.

That is, in the configuration, the service charger 12 and the emergency charger 13 in FIG. 14 are replaced with the DC—DC power conversion unit 14 described in the first to fourth embodiments.

The operation of the DC—DC power conversion units 14 in FIGS. 9 to 11 was previously described in the first to fourth embodiments and will not be discussed again.

In the embodiments, the electricity storage units are chemical secondary batteries, but the invention can also be applied to any other electricity storage unit including a physical battery such as an electric double-layer capacitor and a DC power supply unit with voltage fluctuation such as a solar battery or a fuel battery, needless to say.

A filter circuit other than the smoothing capacitor on the input side of the main electricity storage unit is not discussed, but an appropriate filter circuit may be connected as required.

Further, the insulation-type DC—DC power conversion unit according to the invention can be applied not only to a charging system in an electric vehicle, but also to a current bidirectional DC—DC power conversion system between electricity storage units or between DC power supplies, needless to say.

As described above, in the invention, bidirectional charging systems between first and second DC power supplies, such as two electricity storage units, are formed in one piece as a single electric-insulation-type DC—DC power conversion unit, so that the following advantages are provided:

(1) miniaturization and lightening of a charger can be realized; and
(2) the power conversion unit is applicable to various charging systems including an electric vehicle.

Further, if the insulation-type DC—DC power conversion unit of the invention is applied to an electric vehicle, the following advantages can be expected:

(1) miniaturization and cons reduction of a charger are enabled;
(2) if the main electricity storage unit has insufficient power, the engine can be started or the vehicle can run in an emergency mode by the power of the auxiliary electricity storage unit, so that an electric vehicle high in run reliability can be realized;
(3) the power conversion unit is applicable to various electricity storage units and DC power supply units such as electric double-layer capacitors, solar batteries, and fuel batteries including chemical secondary batteries with large voltage fluctuation; and
(4) the power conversion unit can contribute greatly to widespread use and development of electric vehicles.

What is claimed is:

1. An insulation-type DC—DC power conversion unit for converting an electric power between a first DC supply and second DC supply comprising:

an insulation transformer having a primary winding and secondary winding;
a first input terminal connected to a positive electrode of the first DC supply;
a second input terminal connected to a negative electrode of the first DC supply;
a third input terminal connected to a positive electrode of the second DC supply;
a fourth input terminal connected to a negative electrode of the second DC supply;
a reactor connected to said third input terminal;
a first switch circuit including a semiconductor switch and a diode which are connected in inverse-parallel between said first input terminal and one end of said primary winding of said insulating transformer,
a second switch circuit including a semiconductor switch and a diode which are connected in inverse parallel between said second input terminal and the other end of said primary winding of said insulating transformer;
a third switch circuit including a semiconductor switch and a diode which are connected in inverse-parallel between one end of said secondary winding of said insulating transformer and said reactor;
a fourth switch circuit including a semiconductor switch and a diode which are connected in inverse-parallel between a node of the third switch circuit and said reactor and the other end of said secondary winding of said insulating transformer;
a first diode connected between said first input terminal and said other end of said primary winding, in which a current flows from said second input terminal toward said first input terminal; and
a second diode connected between said second input terminal and said one end of said primary winding, in which a current flows from said second input terminal toward said first input terminal;
wherein currents flow in said semiconductor switches of said first and second switch circuits from said first input terminal toward said second input terminal;
wherein said other end of said secondary winding is connected to said fourth input terminal;
wherein current flows in said semiconductor switch of said third switch circuit from said third input terminal toward said secondary winding;
wherein current flows in said semiconductor switch of said fourth switch circuit from said third input terminal toward said fourth input terminal; and
wherein said one end of said primary winding and said one end of said secondary winding are of the same polarity.

2. An insulation-type DC—DC power conversion unit for converting an electric power between a first DC supply and a second DC supply comprising:

an insulation transformer having a primary winding and a secondary winding;
a first input terminal connected to a positive electrode of the first DC supply;
a second input terminal connected to a negative electrode of the first DC supply;
a third input terminal connected to a positive electrode of the second DC supply;
a fourth input terminal connected to a negative electrode of the second DC supply;
a reactor connected to said third input terminal;
a first switch circuit including a diode and a series circuit of a semiconductor switch and a saturable reactor, in which said series circuit and said diode are connected in inverse-parallel between said first input terminal and one end of said primary winding of said insulating transformer;
a second switch circuit including a diode and a series circuit of a semiconductor switch and a saturable reactor, in which said series circuit and said diode are connected in inverse-parallel between said second input terminal and the other end of said primary winding of said insulating transformer;
a third switch circuit including a diode and a series circuit of a semiconductor switch and a saturable reactor, in which said series circuit and said diode are connected in inverse-parallel between one end of said secondary winding of said insulating transformer and said reactor;
a fourth switch circuit including a diode and a series circuit of a semiconductor switch and a saturable reactor, in which said series circuit and said diode are connected in inverse-parallel between a node of the third switch circuit and said reactor and the other end of said secondary winding of said insulating transformer;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input terminal;

wherein current flows in said semiconductor switch of said third switch circuit from said third input terminal toward said secondary winding;

wherein current flows in said semiconductor switch of said fourth switch circuit from said third input terminal toward said fourth input terminal; and wherein said one end of said primary winding and said one end of said secondary winding are of the same polarity.

3. An insulation-type DC—DC power conversion unit for converting an electric power between a first DC supply and a second DC supply comprising:

an insulation transformer having a primary winding and a secondary winding;

a first input terminal connected to a positive electrode of the first DC supply;

a second input terminal connected to a negative electrode of the first DC supply;

a third input terminal connected to a positive electrode of the second DC supply;

a fourth input terminal connected to a negative electrode of the second DC supply;

a reactor connected to said third input terminal;

a first switch circuit including a semiconductor switch, a circuit changing switch and a diode whose polarity is opposite to said semiconductor switch, in which either said diode or said semiconductor switch is connected between said first input terminal and one end of said primary winding of said insulating transformer through said circuit changing switch;

a second switch circuit including a semiconductor switch, a circuit changing switch and a diode whose polarity is opposite to said semiconductor switch, in which either said diode or said semiconductor switch is connected between said second input terminal and the other end of said primary winding of said insulating transformer through said circuit changing switch;

a third switch circuit including a semiconductor switch, a circuit changing switch and a diode whose polarity is opposite to said semiconductor switch, in which either said diode or said semiconductor switch is connected between one end of said secondary winding of said insulating transformer and said reactor through said circuit changing switch;

a fourth switch circuit including a semiconductor switch, a circuit changing switch and a diode whose polarity is opposite to said semiconductor switch, in which either said diode or said semiconductor switch is connected between a node of the third switch circuit and said reactor and the other end of said secondary winding of said insulating transformer through said circuit changing switch;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input terminal;

wherein current flows in said semiconductor switch of said third switch circuit from said third input terminal toward said secondary winding;

wherein current flows in said semiconductor switch of said fourth switch circuit from said third input terminal toward said fourth input terminal; and wherein said one end of said primary winding and said one end of said secondary winding are of the same polarity.

4. An insulation-type DC—DC power conversion unit for converting an electric power between a first DC supply and a second DC supply comprising:

an insulation transformer having a primary winding and a secondary winding;

a first input terminal connected to a positive electrode of the first DC supply;

a second input terminal connected to a negative electrode of the first DC supply;

a third input terminal connected to a positive electrode of the second DC supply;

a fourth input terminal connected to a negative electrode of the second DC supply;

a reactor connected to said third input terminal;

a first switch circuit including a semiconductor switch, a circuit changing switch and a diode whose polarity is opposite to said semiconductor switch, in which either said diode or said switch circuit is connected between said first input terminal and one end of said primary winding of said insulating transformer through said circuit changing switch;

a second switch circuit including a semiconductor switch, a circuit changing switch and a diode whose polarity is opposite to said semiconductor switch, in which either said diode or said switch circuit is connected between said second input terminal and the other end of said primary winding of said insulating transformer through said circuit changing switch;

a third switch circuit between one end of said secondary winding and the other end of said secondary winding including a first semiconductor switch and a second semiconductor switch connected to each other in series, a third diode and a fourth diode connected to each other in series and a circuit changing switch which connects said reactor to either a node between said first and second semiconductor switches of said third switch circuit or a node between said third and fourth diodes;

a first diode connected between said first input terminal and said other end of said primary winding, in which a current flows from said second input terminal toward said first input terminal; and a second diode connected between said second input terminal and said one end of said primary winding, in which a current flows from said second input terminal toward said first input terminal;

wherein currents flow in said semiconductor switches of said first and second switch circuits from said first input terminal toward said second input terminal;

wherein said other end of said secondary winding is connected to said fourth input-terminal;

wherein current flows in said first semiconductor switch of said third switch circuit from said third input terminal toward said secondary winding;

wherein current flows in said second semiconductor switch of said third switch circuit from said third input terminal toward said fourth input terminal;

wherein current flows in said third diode of said third switch circuit from said secondary winding toward said third input terminal;

wherein current flows in said fourth diode of said third switch circuit from said fourth input terminal toward said third input terminal; and wherein said one end of said primary winding and said one end of said secondary winding are of the same polarity.

5. An insulation-type DC—DC power conversion unit as claimed in claim 1, 2, 3 or 4, wherein said first and second switch circuits are controlled for controlling an electric power transmitted from said first and second input terminals toward said third and fourth input terminals.

6. An insulation-type DC—DC power conversion unit as claimed in claim 1, 2 or 3, wherein said third and fourth switch circuits are controlled for controlling an electric power transmitted from the third and fourth input terminals toward the first and second input terminals.

7. An insulation-type DC—DC power conversion unit as claimed in claim 4, wherein said third switch circuit is controlled for controlling an electric power transmitted from the third and fourth input terminals toward the first and second input terminals.

8. An electric system for an electric vehicle comprising:

a main electricity storage unit for driving a vehicle;

an auxiliary electricity storage unit for an auxiliary machine; and said insulation-type DC—DC power conversion unit as claimed in claim 1, 2, 3, or 4, which is connected between said main electricity storage unit and said auxiliary electricity storage unit.

9. An electric system for an electric vehicle as claimed in claim 8, wherein said main electricity storage unit is selected from the group consisting of: a chemical secondary battery, an electric double-layer capacitor battery, a solar battery, and a fuel battery.

10. An electric system for an electric vehicle as claimed in claim 9, wherein the auxiliary electricity storage unit is an electric double-layer capacitor battery.

11. An electric system for an electric vehicle comprising:

a main electricity storage unit for driving a vehicle;

an auxiliary electricity storage unit for an auxiliary machine; and said insulation-type DC—DC power conversion unit as claimed in claim 5, which is connected between said main electricity storage unit and said auxiliary electricity storage unit.

12. An electric system for an electric vehicle as claimed in claim 11, wherein said main electricity storage unit is selected from the group consisting of: a chemical secondary battery, an electric double-layer capacitor battery, a solar battery, and a fuel battery.

13. An electric system for an electric vehicle as claimed in claim 12, wherein the auxiliary electricity storage unit is an electric double-layer capacitor battery.

14. An electric system for an electric vehicle comprising:

a main electricity storage unit for driving a vehicle;

an auxiliary electricity storage unit for an auxiliary machine; and said insulation-type DC—DC power conversion unit as claimed in claim 6, which is connected between said main electricity storage unit and said auxiliary electricity storage unit.

15. An electric system for an electric vehicle as claimed in claim 14, wherein said main electricity storage unit is selected from the group consisting of: a chemical secondary battery, an electric double-layer capacitor battery, a solar battery, and a fuel battery.

16. An electric system for an electric vehicle as claimed in claim 15, wherein the auxiliary electricity storage unit is an electric double-layer capacitor battery.

17. An electric system for an electric vehicle comprising:

a main electricity storage unit for driving a vehicle;

an auxiliary electricity storage unit for an auxiliary machine; and said insulation-type DC—DC power conversion unit as claimed in claim 7, which is connected between said main electricity storage unit and said auxiliary electricity storage unit.

18. An electric system for an electric vehicle as claimed in claim 17, wherein said main electricity storage unit is selected from the group consisting of: a chemical secondary battery, an electric double-layer capacitor battery, a solar battery, and a fuel battery.

19. An electric system for an electric vehicle as claimed in claim 18, wherein the auxiliary electricity storage unit is an electric double-layer capacitor battery.

* * * * *